Jan. 27, 1942.   C. F. HARRIS   2,271,073
INSURANCE VENDOR
Filed March 2, 1938   4 Sheets-Sheet 1

Charles F. Harris
INVENTOR

BY Victor J. Evans & Co.
ATTORNEYS

Jan. 27, 1942.  C. F. HARRIS  2,271,073
INSURANCE VENDOR
Filed March 2, 1938  4 Sheets-Sheet 2

Charles F. Harris
INVENTOR

BY Victor J. Evans & Co.
ATTORNEYS

Jan. 27, 1942.  C. F. HARRIS  2,271,073
INSURANCE VENDOR
Filed March 2, 1938 4 Sheets-Sheet 3
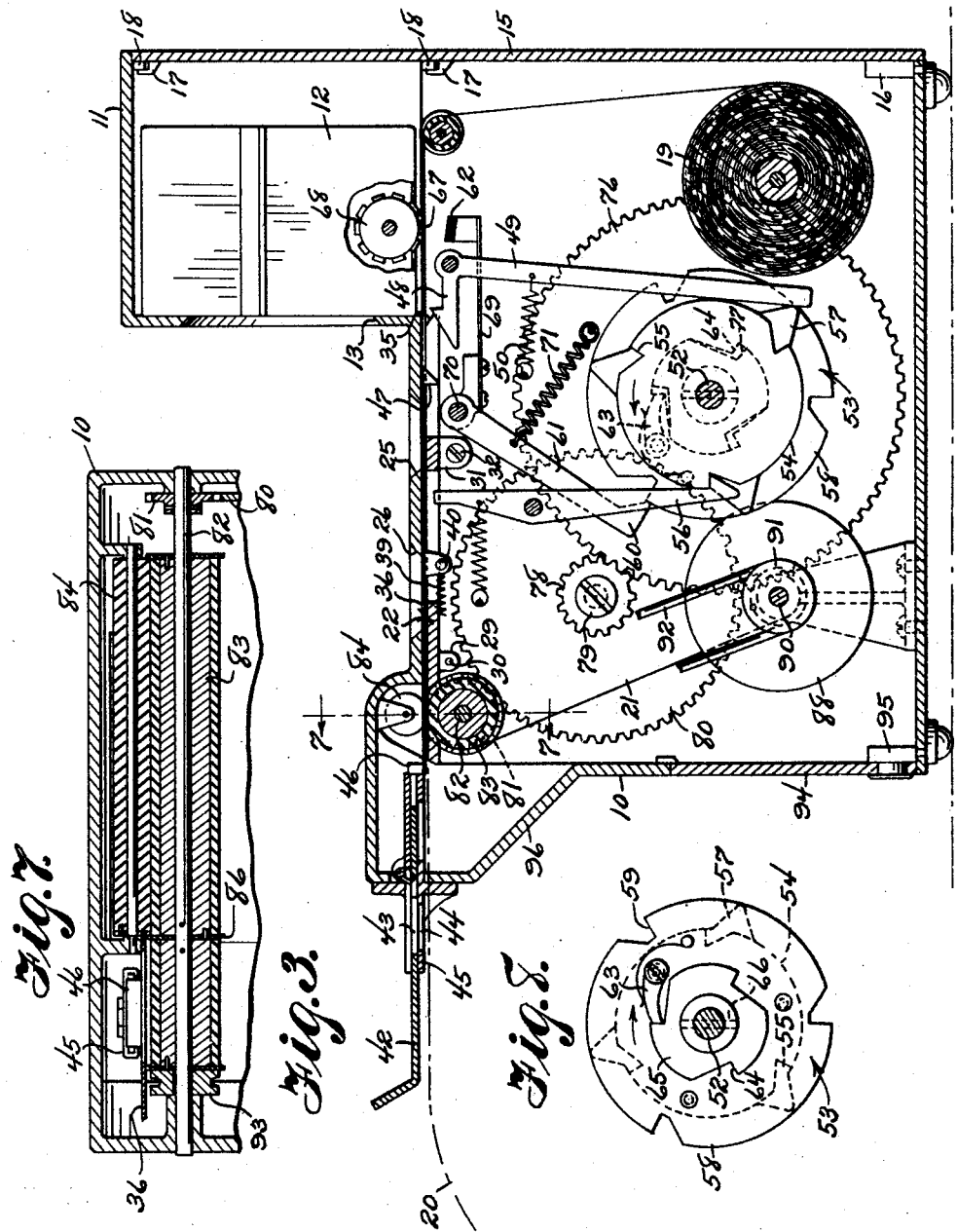
Charles F. Harris
INVENTOR
BY Victor J. Evans & Co.
ATTORNEYS
WITNESS Jan. 27, 1942.  C. F. HARRIS  2,271,073
INSURANCE VENDOR
Filed March 2, 1938  4 Sheets-Sheet 4
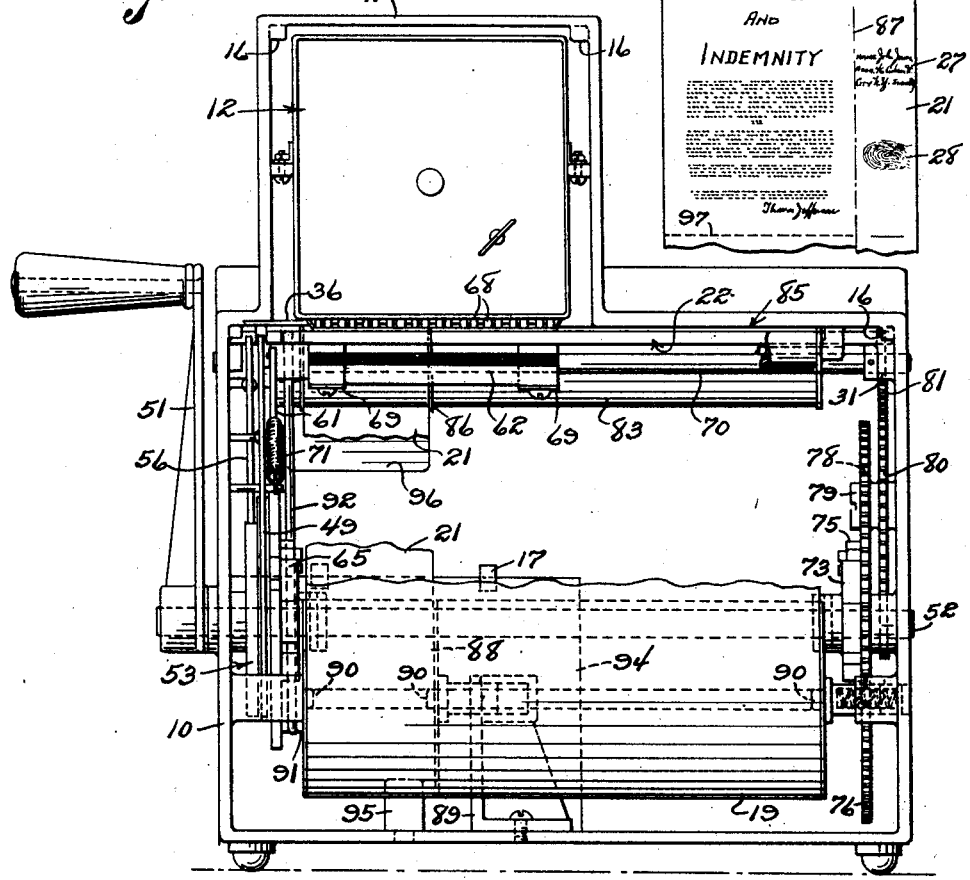
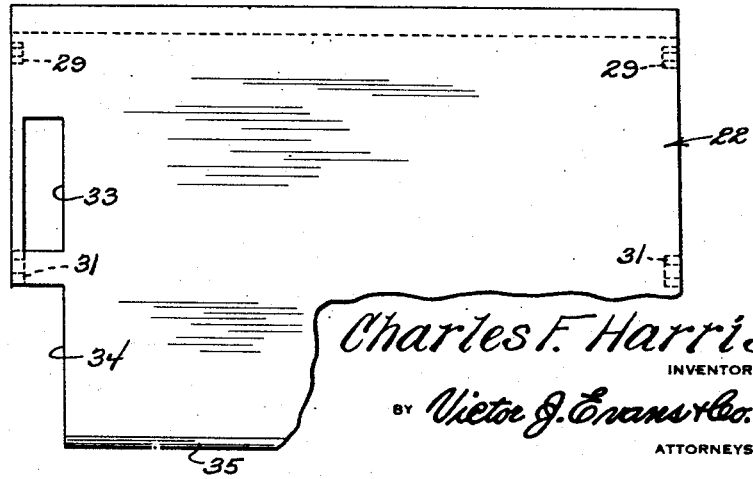
Charles F. Harris
INVENTOR
BY Victor J. Evans & Co.
ATTORNEYS Patented Jan. 27, 1942

2,271,073

UNITED STATES PATENT OFFICE 2,271,073

INSURANCE VENDOR

Charles F. Harris, Fayetteville, N. C., assignor of one-half to A. E. Dixon, R. M. Olive, and C. E. Rankin, Fayetteville, N. C.

Application March 2, 1938, Serial No. 193,591

7 Claims. (Cl. 101—288)

This invention relates to insurance vendors and has for an object to provide a machine which may be placed in public places such as hotels, filling stations, railroad and bus depots and the like, so that any one desiring casualty protection for the day, may conveniently, drop in a coin of the proper denomination and receive an insurance policy.

A further object of the invention is to provide a machine which will make and maintain a record of each purchase of insurance.

A further object of the invention is to provide a machine and paper suitable for use in obtaining a finger print of the purchaser to provide an identification of the insurance purchaser.

A further object is to provide a machine of this type which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 3 is a longitudinal sectional view of the insurance vendor taken on the line 3—3 of Figure 1.

Figure 4 is a rear elevation of the insurance vendor with the back plate removed to expose the mechanism.

Figure 7 is a cross sectional view taken on the line 7—7 of Figure 3 and showing the paper feed rolls and cutter for severing the policy from the record strip.

Figure 8 is a side elevation showing the cams on one end of the main shaft for operating the printing arm during the initial movement of the handle lever after the purchaser has applied his finger print and written his name and address on the record strip.

Figure 10 is a plan view of the table plate for supporting the policy during travel from the supply roll to the delivery position.

Figure 11 is a plan view of the policy showing the same scored to provide a record strip severed along the score.

Figure 1:
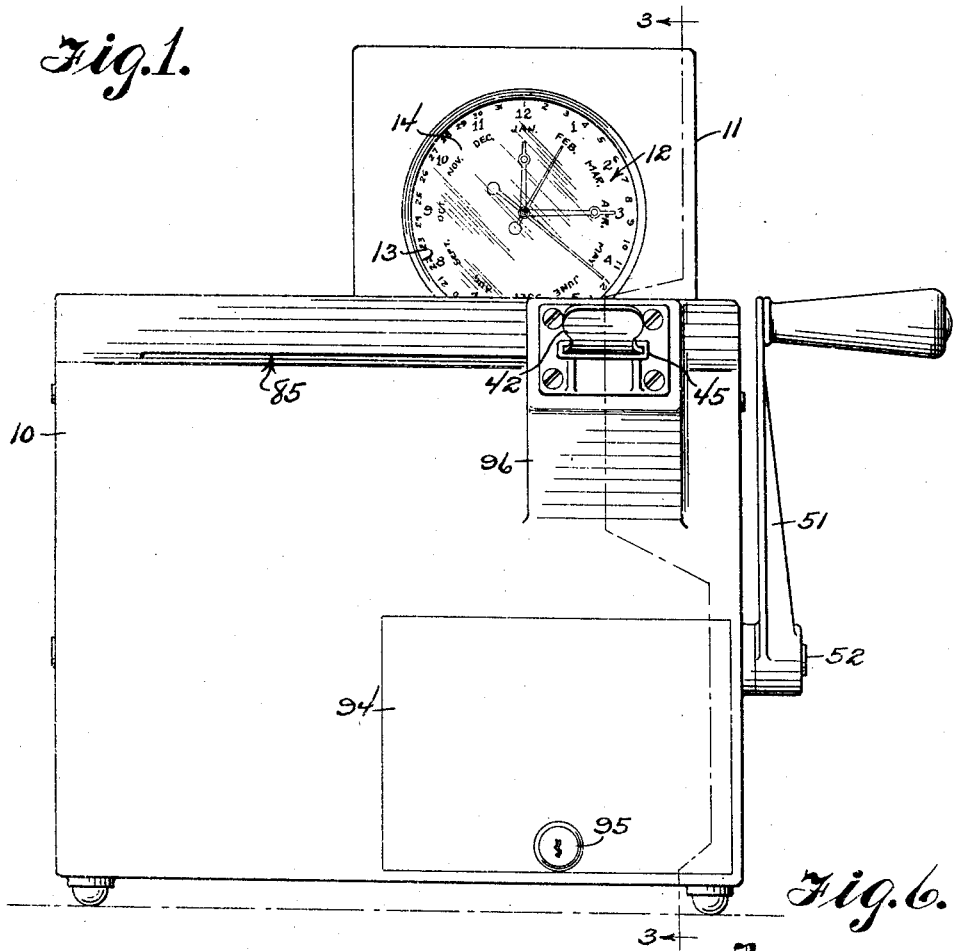
Figure 1 is a front elevation of an insurance vendor constructed in accordance with the invention.

Referring now to the drawings in which like characters of reference designate similar parts in the various views, 10 designates a casing of substantially rectangular cross section and longitudinal section the same being provided at the rear end of the top wall with an extension 11 for housing a conventional calendar printing clock 12 and being provided with an opening 13 in the front face to permit the dial 14 of the clock being exposed to view of the policy purchaser. The back plate 15 is removably secured in place by a conventional lock 16 at the bottom and angle irons 17 which engage over cleats 18 and permit removal of the back plate to expose the interior of the casing for replenishing the roll 19 of paper upon which the policy 20 and severable record strip 21 is printed.

The policy, with its integral record strip, best shown in Figure 11, is of substantially the same width as the width of the casing and is supported against the underneath face of the top of the casing by a table plate 22, best shown in Figures 3 and 10. A sight opening 23, best shown in Figure 2, formed in the top of the casing, exposes the policy to the purchaser and is closed by a glass pane 24. A pair of openings 25 and 26 are arranged in the top of the casing laterally of the opening 23 and these openings are not covered but expose the integral record strip 21 of the policy to permit the purchaser to write his name and address 27 on that portion of the record strip exposed by the opening 25 and to press his thumb upon that portion of the record strip exposed by the opening 26 to leave his thumb print 28, the paper of the record strip being sensitized or otherwise prepared, for this purpose.

The table plate 22 is provided with perforated lugs 29, best shown in Figure 10, to receive securing devices 30 for attaching the plate at the forward end to the side walls of the casing. Likewise the plate is provided with lugs 31 to receive securing devices 32 for securing the plate near the rear end to the side walls of the casing, as best shown in Figure 3. The plate underneath the openings 25 and 26 is adapted to firmly support the paper while the record strip is receiving the address and thumb print of the policy purchaser. The plate is provided with an elongated opening 33 and is also cut away as shown at 34 in rear of the opening to receive parts of the mechanism hereinafter described, while the rear edge of the plate is beveled as shown at 35 to permit the paper web upon which the policies are printed, to easily enter the space between the plate and the top of the casing.

Slidably mounted between the table plate and the top of the casing is a shield 36 which is in the form of a flat oblong plate having a pair of openings 37 and 38 therein to register respectively with the openings 25 and 26 in the top of the casing and permit the purchaser writing his name and address and imprinting his thumb print. Normally the plate is maintained in a forward position to close both openings 25 and 26, through the medium of a helical spring 39, best shown in Figure 3, which is attached at one end to the stationary table plate 22 and which is attached at the opposite end to a pin 40 which projects laterally from a lug 41 which depends from one longitudinal side of the shield. The shield is slid rearwardly to operative position by conventional coin control mechanism.

Figure 5:
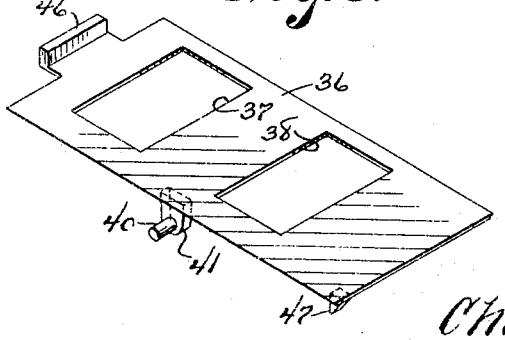
Figure 5 is a detail perspective view of the slide which is provided with openings to expose the finger print portion and the address portion of the company's record of the sale.
Figure 2:
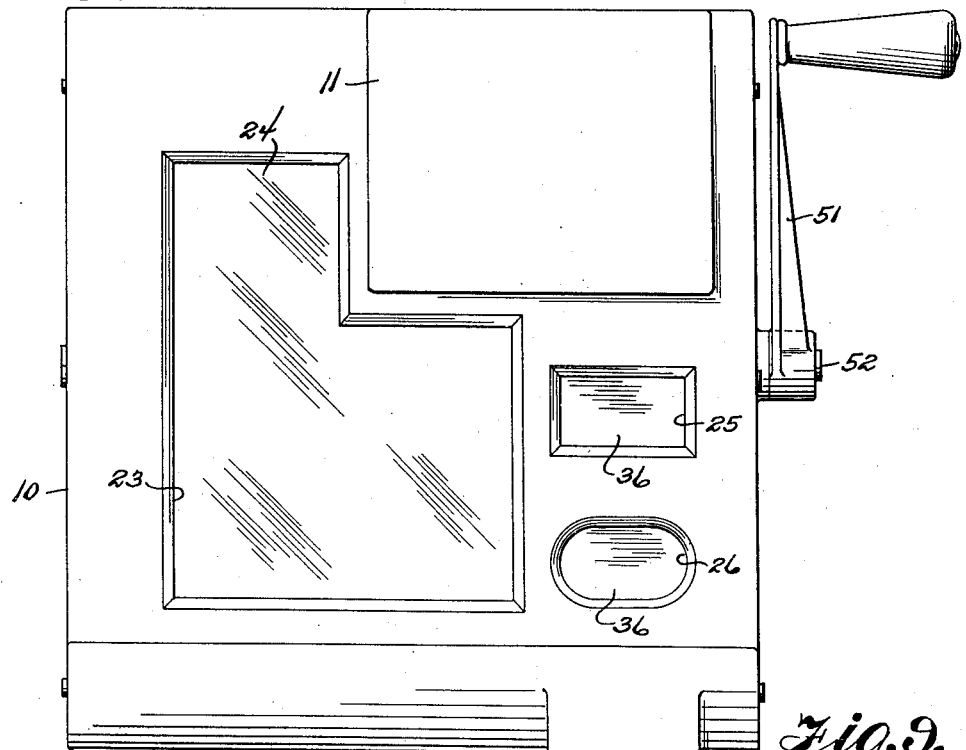
Figure 2 is a plan view of the insurance vendor.

The coin control mechanism comprises broadly a manually operable slide bar 42, best shown in Figures 2 and 3 having an opening 43 of sufficient diameter to receive a coin of predetermined value and permit lesser coins to fall through the underlying opening 44 of the slide bar guide 45. As is customary a coin of the proper value permits the slide bar to be pushed forwardly into engagement with an upstanding lug 46 on the front end of the shield, 36, as best shown in Figures 3 and 5, continued movement of the slide bar shoving the shield to open position. The shield is yieldably locked in open position through the medium of a beveled tooth 47 which projects from the rear right corner of the shield and is adapted to engage over the short notched arm 48 of a bell crank lever 49 which is normally held in the path of the tooth by a helical spring 50 which is connected at one end to the long arm of the bell crank lever and at the opposite end is connected to the casing.

The printing of the date and hour is performed subsequently to the purchaser writing his name and affixing his thumb print and for this purpose a handle lever 51, best shown in Figures 1 and 2, is secured to one end of a main shaft 52, best shown in Figure 3. The shaft is journaled in the sides of the casing and a three-plate cam 53 is loosely mounted on one end of the shaft. The cam comprises three stepped surfaces the first of which is a disc 54 having three notches 55 to respectively receive the toothed end of a lever 56 when the handle lever 51 is pulled toward the purchaser through an angular distance of about 120 degrees.

The second stepped surface of the cam is provided with three teeth 57 equally spaced apart to engage with the free end of the long arm of the bell crank lever 49 and move the lever to disengage the notched end of the short arm 48 from the tooth 47 of the shield.

The third stepped surface of the cam comprises a disc 58 having three equally spaced notches 59 adapted to receive the toothed end 60 of a bell crank lever 61 carrying the printing bar 62, best shown in Figure 6 and later described.

Also secured to the disc 58 of the cam, as best shown in Figure 8, is a spring pressed dog 63 which is adapted to successively engage in equally spaced notches 64 of a ratchet wheel 65 which is keyed to the main shaft 52 through the medium of a pin 66.

After the purchaser has written his name and address and applied his thumb print to the record strip 21 he swings the handle lever 51 whereupon the ratchet wheel 65, through the medium of the dog 63, rotates the cam 53 in the direction of the arrowhead shown in Figure 8. At the beginning of rotation a tooth 57 engages the long arm 49 of the bell crank lever and eventually dislodges the hooked end of the short arm 48 from the tooth 47 of the shield permitting the spring 39 of the shield to retract the shield to closing position. Prior to this movement of the lever the beforementioned pin 40 of the shield will have impinged against the upper end of the lever 56 and maintained the lever disengaged from any notch 55 in the cam so that the cam is unlocked and free to be turned, as just described.

Immediately after the tooth 57 has operated the bell crank lever 49 the toothed end 60 of the printing bell crank lever will drop into the notch 59 of the cam 53, Figs. 3 and 8, and swing the printing bar 62 upwardly against the paper web to force the web against the type 67 of the printing wheels 68 of the calendar clock.

Figure 6:
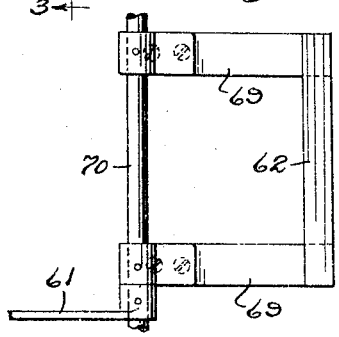
Figure 6 is a plan view of the printing arm.

As best shown in Figure 6 the printing bar is carried upon the ends of a pair of leaf springs 69 which are connected to the shaft 70 of the lever 61 so that immediately upon printing contact being made the arms spring back by virtue of their own resiliency and thus a sharp clear impression is made.

A helical spring 71, best shown in Figure 3, is connected to the casing and to the lever 61 to positively swing the printing bar into printing position when the toothed end 60 of the lever 61 drops into the notch 59 of the cam.

Immediately after the printing operation has been performed the web containing the policy printed with the date thereon, as shown at 72 in Figure 11, on both the policy proper and detachable record strip, is fed from the machine and the record strip simultaneously severed and wound upon a takeup spool as will now be described.

Figure 9:
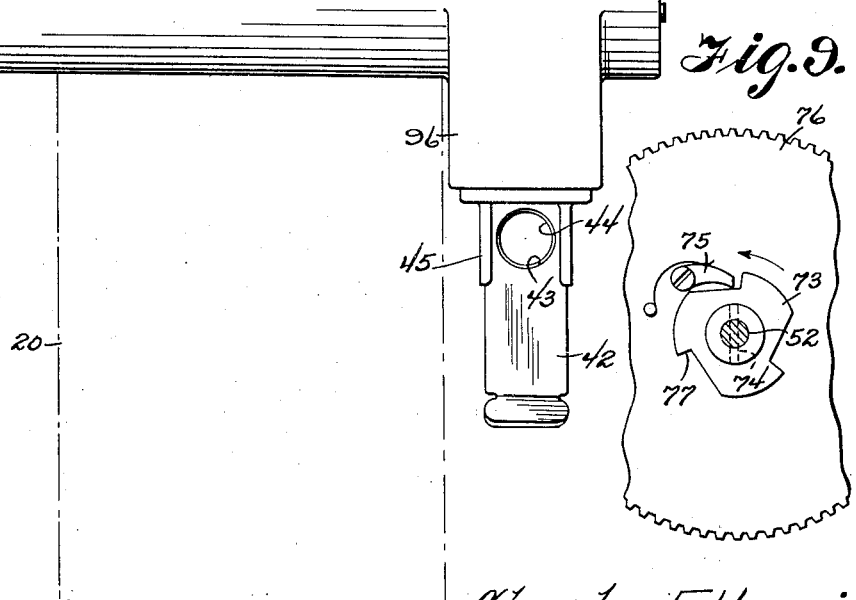
Figure 9 is a side elevation of the ratchet device on the opposite end of the main shaft, the ratchet device having delayed action to feed the policy and record strip past the cutter after the printing operation.

As best shown in Figure 9 upon the opposite end of the main shaft 52 from the stepped cam 53 a ratchet wheel 73 is keyed to the shaft by a pin 74. A spring pressed dog 75 is pivotally mounted on the initial gear 76 of a train of gears and engages in notches 77 in the ratchet wheel, these notches preferably being three in number and spaced equi-distant apart. It will be noted that there is a delayed action of this ratchet wheel in that a lost motion clearance normally exists between the end of the dog and the end of the notch in which it rests so that the printing operation may be completed by initial turning of the crank handle 51 before the ratchet wheel 73 engages the dog to start turning the train of web feeding gears.

As best shown in Figure 3 the train of gears comprises the large initial gear 76 which meshes with a pinion 78 fixed to a stub shaft 79, as best shown in Figures 3 and 4, the pinion having integral therewith a large gear 80 which meshes with a drive pinion 81 which is fixed to the end of a shaft 82 carrying a rubber faced feed roller 83, best shown in Figure 7. A second rubber faced feed roller 84 is superposed above the feed roller 83 and exerts downward friction upon the paper to hold the paper web engaged with the rubber facing of the roller 83 to be fed toward the front end of the casing and discharged through a slot 85 in the front wall of the casing, as best shown in Figure 1, after the record strip 21 is severed as will now be described.

A disc cutter 86, best shown in Figure 7, is fixed to the shaft 82 of the driven feed roller 83 and intercepts the policy with the attached record strip and as the policy is fed forwardly the record strip is severed therefrom along a longitudinal score 87, best shown in Figure 11. The severed strip is wound upon a takeup spool 88 which is mounted upon a pedestal 89 and is equipped with a shaft 90 to which a pulley 91 is secured. A belt 92 is trained over this pulley and a similar pulley 93 fixed to the shaft of the driven feed roller 83, as best shown in Figures 4 and 7. When the policy 20 is being fed through the discharge slot 85, as indicated in Figure 3, the record strip 21 will be severed by the cutter 86 and will be wound up upon the takeup spool 88 to preserve an identifying record of the sale.

As best shown in Figure 1 a door 94 is disposed on the front wall of the casing and is controlled by a conventional lock 95. Access may be gained to the interior of the casing through this door to retrieve the coins deposited by the slide bar 42 into a chute 96 disposed at the top of the front wall of the casing.

In practice when the handle is pulled down to print and discharge the policy the lever 56 will lodge in a notch 55 of the disc 54 of cam 50 at the end of the limit of movement of the lever at which time the printed policy has been discharged from the machine sufficiently to be accessible to the purchaser but a predetermined amount less than necessary to expose a transverse score 97 along which the policy may be severed manually and retained by the purchaser.

Accordingly, when the printed policy is pulled forwardly to expose the transverse score 97, the feed rolls 83, 84, undergo an added forward feeding movement to this extent causing a proportional movement of the associated train of gears sufficiently to move the initial gear 76 relatively to the shaft 52, Fig. 9, as necessary to reestablish the clearance between pawl 75 carried thereby and the next adjacent notch 77 of the ratchet wheel 73, thereby providing for the previously mentioned lost-motion drive of the feed rolls in the next operation of the machine.

Since the operation of the device has been described as the description of the parts progressed it is thought that the construction and operation of the invention will be fully understood without further explanation.

What is claimed is:

1. In a machine having a casing and means for supporting a web, said casing having a sight opening therein, a main shaft supported in said casing and a cam comprising a plurality of cam surfaces mounted on said shaft and adapted to be driven thereby, a spring closed shield slidably mounted in the casing and normally closing said sight opening therein, latching means for detachably locking the shield in open position exposing the web through said sight opening, a lever connected to said latching means and actuated by one of the cam surfaces of said cam for releasing the shield on partial rotation of the shaft, a latch for locking said cam against movement by engaging another cam surface of said cam, and means on said shield adapted to disengage said latch from locking engagement with said cam when said shield is moved to open position.

2. In a machine having a casing and means for supporting a web, said casing having a sight opening therein, a main shaft supported in said casing and a cam comprising three cam surfaces mounted on said shaft and adapted to be driven thereby, a web impressing bar controlled by one of said cam surfaces, a spring closed shield slidably mounted in the casing and normally closing said sight opening therein, latching means for detachably locking the shield in open position exposing the web through said sight opening, a lever connected to said latching means and actuated by a second cam surface of said cam for releasing the shield on partial rotation of the shaft, a latch for locking said cam against movement by engaging a third cam surface of said cam, and means on said shield adapted to disengage said latch from locking engagement with said cam when said shield is moved to open position.

3. In a vending machine having a casing, a printing means carried by the casing and a plate in the casing for supporting a web, said casing having a sight opening therein above the plate, a main shaft supported in said casing and a cam comprising a plurality of cam surfaces mounted on said shaft and adapted to be driven thereby, a printing bar controlled by one of said cam surfaces and adapted to force the web against said printing means, a shield slidably mounted in the casing and normally closing said sight opening therein, latching means for detachably locking the shield in open position exposing the web through said sight opening, an arm connected to said latching means and actuated by a second cam surface of said cam for releasing the shield on partial rotation of the shaft, a member for locking said cam against movement by engaging a third cam surface of said cam, and means on said shield adapted to disengage said locking member from locking engagement with said cam when said shield is moved to open position.

4. In a vending machine having a casing, a printing means carried by the casing and a plate in the casing for supporting a web, said casing having a sight opening therein above the plate, a main shaft supported in said casing and a cam comprising a plurality of cam surfaces mounted on said shaft and adapted to be driven thereby, a printing bar controlled by one of said cam surfaces and adapted to force the web against said printing means, a shield slidably mounted in the casing and normally closing said sight opening therein, latching means for detachably locking the shield in open position exposing the web through said sight opening, an arm connected to said latching means and actuated by a second cam surface of said cam for releasing the shield on partial rotation of the shaft, a feeding member mounted on said shaft and a lost motion mechanism for driving said feeding member after rotation of the shaft for said printing operation, means for locking said cam against movement by engaging a third cam surface of said cam, and means on said shield adapted to disengage said locking means from locking engagement with said cam when said shield is moved to open position.

5. In a vending machine having a casing, a printing means carried by the casing and a plate in the casing for supporting a web, said casing having a sight opening therein above the plate, a main shaft supported in said casing and a cam comprising a plurality of cam surfaces mounted on said shaft and adapted to be driven thereby, a printing bar controlled by one of said cam surfaces and adapted to force the web against said printing means, a spring closed shield slidably mounted in the casing and normally closing said sight opening therein, latching means for detachably locking the shield in open position exposing the web through said sight opening, a lever connected to said latching means and actuated by a second cam surface of said cam for releasing the shield on partial rotation of the shaft, a latch for locking said cam against movement by engaging a third cam surface of said cam, and means on said shield adapted to disengage said latch from locking engagement with said cam when said shield is moved to open position.

6. In a vending machine having a casing, a printing means carried by the casing and a plate in the casing for supporting a web, said casing having a sight opening therein above the plate, a main shaft supported in said casing and a cam comprising a plurality of cam surfaces mounted on said shaft and adapted to be driven thereby, a printing bar controlled by one of said cam surfaces and adapted to force the web against said printing means, a spring closed shield slidably mounted in the casing and normally closing said sight opening therein, latching means for detachably locking the shield in open position exposing the web through said sight opening, a lever connected to said latching means and actuated by a second cam surface of said cam for releasing the shield on partial rotation of the shaft, a feeding member mounted on said shaft and a lost motion mechanism for driving said feeding member after rotation of the shaft for said printing operation, a latch for locking said cam against movement by engaging a third cam surface of said cam, and means on said shield adapted to disengage said latch from locking engagement with said cam when said shield is moved to open position.

7. In a vending machine having a casing, a printing means carried by the casing and a plate in the casing for supporting a web, said casing having a sight opening therein above the plate, a main shaft supported in said casing and a cam comprising a plurality of cam surfaces mounted on said shaft and a ratchet wheel adapted to turn said cam on rotation of said shaft, a printing bar controlled by one of said cam surfaces and adapted to force the web against said printing means, a spring closed shield slidably mounted in the casing and normally closing said sight opening therein, latching means for detachably locking the shield in open position exposing the web through said sight opening, a lever connected to said latching means and actuated by a second cam surface of said cam for releasing the shield on partial rotation of the shaft, a feeding member mounted on said shaft and a second ratchet wheel associated therewith for providing a delayed action drive of said feeding member after rotation of the shaft for said printing operation, a latch for locking said cam against movement by engaging a third cam surface of said cam, and means on said shield adapted to disengage said latch from locking engagement with said cam when said shield is moved to open position.

CHARLES F. HARRIS.